United States Patent
Boice et al.

(10) Patent No.: US 10,075,474 B2
(45) Date of Patent: Sep. 11, 2018

(54) NOTIFICATION SUBSYSTEM FOR GENERATING CONSOLIDATED, FILTERED, AND RELEVANT SECURITY RISK-BASED NOTIFICATIONS

(71) Applicant: Honeywell International Inc., Morris Plains, NJ (US)

(72) Inventors: Eric T. Boice, Mesa, AZ (US); Ziad M. Kaakani, Scottsdale, AZ (US); Seth G. Carpenter, Phoenix, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/871,521

(22) Filed: Sep. 30, 2015

(65) Prior Publication Data
US 2016/0234251 A1 Aug. 11, 2016

Related U.S. Application Data (60) Provisional application No. 62/113,221, filed on Feb. 6, 2015.

(51) Int. Cl.
*H04L 29/06* (2006.01)
*H04L 12/24* (2006.01)

(52) U.S. Cl.
CPC ............. *H04L 63/20* (2013.01); *H04L 41/12* (2013.01); *H04L 63/02* (2013.01); *H04L 63/1433* (2013.01)

(58) Field of Classification Search
CPC ..... H04L 63/00; H04L 63/14; H04L 63/1408; H04L 63/1416; H04L 63/1433;
(Continued)

(56) References Cited

U.S. PATENT DOCUMENTS 6,266,773 B1 7/2001 Kisor et al.
7,010,696 B1 * 3/2006 Cambridge ............. G06F 21/56
713/188

(Continued)

FOREIGN PATENT DOCUMENTS

| JP | 2008-112284 | 5/2008 |
|---|---|---|
| KR | 10-2005-0068052 | 7/2005 |
| KR | 10-1060277 | 8/2011 |
| KR | 10-2014-0097691 | 8/2014 |
| WO | WO 2013/166126 A1 | 11/2013 |

OTHER PUBLICATIONS

Marshal, Robert "How to Configure Alerts in System Center 2012" [Online], Apr. 8, 2013 [Retrieved on: Dec. 8, 2016], retrieved from: < https://blogs.technet.microsoft.com/uktechnet/2013/04/08/guest-post-how-to-configure-alerts-in-system-center-2012/ >.*

(Continued)

*Primary Examiner* — Eric W Shepperd (57) ABSTRACT

This disclosure provides a notification subsystem for generating consolidated, filtered, and relevant security risk-based notifications. A method includes discovering multiple devices in a computing system. The method includes grouping the multiple devices into multiple security zones. The method includes generating a risk value identifying at least one cyber-security risk of the devices for one of the security zones. The method includes comparing the risk value to a threshold. The method includes automatically generating a notification for one or more users when the risk value violates the threshold.

20 Claims, 3 Drawing Sheets

(58) Field of Classification Search
CPC ....... H04L 43/00; H04L 43/04; H04L 43/045; H04L 43/16; G06F 21/00; G06F 21/50; G06F 21/55–21/554; G06F 21/577; G06F 2221/21; G06Q 10/00; G06Q 10/06; G06Q 10/063; G06Q 10/0635

See application file for complete search history.

(56) References Cited

U.S. PATENT DOCUMENTS

| | | |
|---|---|---|
| 7,136,856 B2 | 11/2006 | Birbo et al. |
| 7,152,105 B2 | 12/2006 | McClure et al. |
| 7,415,503 B2 | 8/2008 | Chemoguzov |
| 7,627,891 B2 | 12/2009 | Williams et al. |
| 7,900,259 B2 | 3/2011 | Jeschke et al. |
| 7,908,660 B2 | 3/2011 | Bahl |
| 7,921,459 B2 | 4/2011 | Houston et al. |
| 7,984,504 B2 | 7/2011 | Hemacki et al. |
| 8,020,210 B2 | 9/2011 | Tippett et al. |
| 8,087,087 B1 | 12/2011 | Oorschot et al. |
| 8,141,155 B2 | 3/2012 | Jeschke et al. |
| 8,392,995 B2 | 3/2013 | Williamson et al. |
| 8,438,643 B2 | 5/2013 | Wiemer et al. |
| 8,494,974 B2 | 7/2013 | Watters et al. |
| 8,595,831 B2 | 11/2013 | Skare |
| 8,595,844 B2 | 11/2013 | Bahl |
| 8,621,637 B2 | 12/2013 | Al-Harbi et al. |
| 8,712,596 B2 | 4/2014 | Scott |
| 8,726,393 B2 | 5/2014 | Macy et al. |
| 8,763,074 B2* | 6/2014 | Bechtel ................ H04L 63/105 713/182 |
| 8,769,412 B2 | 7/2014 | Gill et al. |
| 8,776,168 B1 | 7/2014 | Gibson et al. |
| 8,806,632 B2 | 8/2014 | Stefanidakis et al. |
| 8,856,936 B2 | 10/2014 | Datta Ray et al. |
| 9,166,999 B1* | 10/2015 | Kulkarni ............. H04L 63/1433 |
| 9,373,267 B2 | 6/2016 | Sadeh-Koniecpol et al. |
| 9,401,926 B1 | 7/2016 | Dubow et al. |
| 2003/0126472 A1 | 7/2003 | Banzhaf |
| 2003/0154393 A1 | 8/2003 | Young |
| 2004/0030531 A1 | 2/2004 | Miller et al. |
| 2004/0193907 A1 | 9/2004 | Patanella |
| 2005/0010821 A1 | 1/2005 | Cooper et al. |
| 2005/0144480 A1 | 6/2005 | Kim et al. |
| 2005/0193430 A1 | 9/2005 | Cohen et al. |
| 2005/0283751 A1 | 12/2005 | Bassin et al. |
| 2006/0010493 A1 | 1/2006 | Piesco et al. |
| 2006/0085852 A1 | 4/2006 | Sima |
| 2006/0101517 A1 | 5/2006 | Banzhof et al. |
| 2006/0117388 A1 | 6/2006 | Nelson et al. |
| 2006/0123482 A1 | 6/2006 | Aaron |
| 2006/0126501 A1 | 6/2006 | Ramaswamy |
| 2006/0174121 A1 | 8/2006 | Omae et al. |
| 2006/0195914 A1* | 8/2006 | Schwartz ............. G06F 21/645 726/32 |
| 2006/0206941 A1 | 9/2006 | Collins |
| 2006/0239645 A1 | 10/2006 | Curtner et al. |
| 2007/0067846 A1 | 3/2007 | McFarlane et al. |
| 2007/0094491 A1* | 4/2007 | Teo ..................... H04L 63/1408 713/153 |
| 2007/0143851 A1 | 6/2007 | Nicodemus et al. |
| 2007/0223398 A1 | 9/2007 | Luo et al. |
| 2007/0226794 A1 | 9/2007 | Howcroft et al. |
| 2007/0289008 A1* | 12/2007 | Andreev ................ G06Q 40/00 726/12 |
| 2008/0016339 A1 | 1/2008 | Shukla |
| 2008/0047016 A1 | 2/2008 | Spoonamore |
| 2008/0141377 A1 | 6/2008 | Dunagan et al. |
| 2008/0172347 A1 | 7/2008 | Bernoth et al. |
| 2008/0189788 A1 | 8/2008 | Bahl |
| 2008/0209567 A1 | 8/2008 | Lockhart et al. |
| 2008/0229420 A1 | 9/2008 | Jeschke et al. |
| 2008/0235196 A1 | 9/2008 | Broussard et al. |
| 2008/0262822 A1 | 10/2008 | Hardwick et al. |
| 2009/0024663 A1* | 1/2009 | McGovern ............ G06F 21/577 |
| 2009/0121860 A1 | 5/2009 | Kimmel et al. |
| 2009/0228316 A1* | 9/2009 | Foley ................ G06Q 10/0635 705/7.28 |
| 2010/0121929 A1* | 5/2010 | Lin ........................ G06F 21/577 709/206 |
| 2010/0125911 A1 | 5/2010 | Bhaskaran |
| 2010/0125912 A1 | 5/2010 | Greenshpon et al. |
| 2010/0242114 A1 | 9/2010 | Bunker et al. |
| 2010/0318512 A1 | 12/2010 | Ludwig |
| 2010/0324945 A1 | 12/2010 | Hessing |
| 2011/0039237 A1 | 2/2011 | Skare |
| 2011/0126111 A1 | 5/2011 | Gill et al. |
| 2011/0162073 A1 | 6/2011 | Jeschke et al. |
| 2011/0231412 A1 | 9/2011 | Kariv |
| 2011/0288692 A1 | 11/2011 | Scott |
| 2012/0011077 A1 | 1/2012 | Bhagat |
| 2012/0011590 A1 | 1/2012 | Donovan |
| 2012/0109834 A1 | 5/2012 | Bongiovanni et al. |
| 2012/0180133 A1 | 7/2012 | Al-Harbi et al. |
| 2012/0224057 A1 | 9/2012 | Gill et al. |
| 2012/0255003 A1 | 10/2012 | Sallam |
| 2012/0268269 A1 | 10/2012 | Doyle |
| 2013/0031037 A1 | 1/2013 | Brandt et al. |
| 2013/0067558 A1 | 3/2013 | Markham et al. |
| 2013/0111275 A1 | 5/2013 | Ganesan et al. |
| 2013/0160119 A1 | 6/2013 | Sartin et al. |
| 2013/0174259 A1 | 7/2013 | Pearcy et al. |
| 2013/0212685 A1* | 8/2013 | Kelley .................. G06F 21/577 726/25 |
| 2013/0239177 A1 | 9/2013 | Sigurdson et al. |
| 2013/0247207 A1 | 9/2013 | Hugard et al. |
| 2013/0283336 A1 | 10/2013 | Macy et al. |
| 2013/0298244 A1 | 11/2013 | Kumar et al. |
| 2013/0326002 A1 | 12/2013 | Leuoth et al. |
| 2013/0347107 A1 | 12/2013 | Williams et al. |
| 2014/0007244 A1 | 1/2014 | Martin et al. |
| 2014/0082738 A1 | 3/2014 | Bahl |
| 2014/0130121 A1 | 5/2014 | Lin |
| 2014/0137257 A1 | 5/2014 | Martinez et al. |
| 2014/0165128 A1* | 6/2014 | Auvenshine ............ H04L 63/20 726/1 |
| 2014/0215555 A1 | 7/2014 | Barton et al. |
| 2014/0236668 A1* | 8/2014 | Young .................... G06Q 10/10 705/7.28 |
| 2014/0283083 A1 | 9/2014 | Gula et al. |
| 2014/0289796 A1 | 9/2014 | Moloian et al. |
| 2014/0297495 A1 | 10/2014 | Dalal et al. |
| 2014/0305525 A1 | 10/2014 | Le Moing et al. |
| 2014/0337086 A1 | 11/2014 | Asenjo et al. |
| 2014/0359777 A1* | 12/2014 | Lam ...................... G06F 21/577 726/25 |
| 2015/0018984 A1 | 1/2015 | Williams et al. |
| 2015/0032839 A1 | 1/2015 | Serokurov et al. |
| 2015/0033323 A1 | 1/2015 | Oliphant et al. |
| 2015/0033337 A1 | 1/2015 | Baikalov et al. |
| 2015/0163242 A1 | 6/2015 | Laidlaw et al. |
| 2015/0213369 A1 | 7/2015 | Brandt et al. |
| 2015/0242769 A1 | 8/2015 | Kezeu |
| 2015/0264061 A1 | 9/2015 | Ibatullin et al. |
| 2015/0281287 A1 | 10/2015 | Gill et al. |
| 2015/0370983 A1 | 12/2015 | Vial et al. |
| 2016/0011921 A1 | 1/2016 | Rao et al. |
| 2016/0164892 A1 | 6/2016 | Satish et al. |
| 2016/0205126 A1 | 7/2016 | Boyer et al. |
| 2016/0205143 A1* | 7/2016 | Bryson .................. H04L 63/205 726/1 |
| 2016/0212165 A1 | 7/2016 | Singla et al. |
| 2016/0217160 A1 | 7/2016 | Croft |
| 2016/0330222 A1 | 11/2016 | Brandt et al. |
| 2017/0235848 A1* | 8/2017 | Van Dusen ....... G06F 17/30979 705/12 |

OTHER PUBLICATIONS

Notification of Transmittal of International Search Report and the Written Opinion of the International Searching Authority, or the (56) References Cited

OTHER PUBLICATIONS

Declaration dated Jun. 3, 2016 in connection with International Application No. PCT/US2016/016798, 10 pages.
Notification of Transmittal of International Search Report and the Written Opinion of the International Searching Authority, or the Declaration dated May 13, 2016 in connection with International Application No. PCT/US2016/015890, 11 pages.
Notification of Transmittal of International Search Report and the Written Opinion of the International Searching Authority, or the Declaration dated May 13, 2016 in connection with International Application No. PCT/US2016/016098, 12 page.
Notification of Transmittal of International Search Report and the Written Opinion of the International Searching Authority, or the Declaration dated Jun. 13, 2016 in connection with International Application No. PCT/US2016/016496, 12 pages.
Notification of Transmittal of International Search Report and the Written Opinion of the International Searching Authority, or the Declaration dated Jun. 3, 2016 in connection with International Application No. PCT/US2016/016399, 11 pages.
Notification of Transmittal of International Search Report and the Written Opinion of the International Searching Authority, or the Declaration dated Jun. 3, 2016 in connection with International Application No. PCT/US2016/016265, 10 pages.
Notification of Transmittal of International Search Report and the Written Opinion of the International Searching Authority, or the Declaration dated Jun. 2, 2016 in connection with International Application No. PCT/US2016/015952, 11 pages.
Notification of Transmittal of International Search Report and the Written Opinion of the International Searching Authority, or the Declaration dated May 18, 2016 in connection with International Application No. PCT/US2016/016159, 11 pages.
Gerhards, R.; "The Syslog Protocol"; Network Working Group; Adiscon GmbH; Mar. 2009; 38 pages.
Knapp, E.D.; "Security Intelligence and Analytics in Industrial Systems"; Honeywell Users Group Europe, Middle East and Africa; 2014; 29 pages.
Koelemij, E.D.; "Effective Defense in Depth Strategies for Industrial Control Systems"; Honeywell Users Group Europe, Middle East and Africa; 2014; 21 pages.
Koelemij, S.; "Designing a Secure Industrial Control System"; Honeywell Users Group EMEA; Industrial IT Solutions: 2013; 11 pages.
Koelemij, S.; "Making Cyber Security S.M.A.R.T."; Honeywell Industrial Cyber Security; EMEA HUG Training Session; 2014; 63 pages.
Ricks, B.; "System Center 2012 R2 Operations Manager Documentation"; Microsoft System Center 2012 R2; Microsoft Corp; Nov. 1, 2013; 1389 pages.
Spear, M.; "Industrial Cyber Security 101"; Honeywell Users Group Europe, Middle East and Africa; 2015; 25 pages.
"Certification Testing Specification"; OPC Foundation; Release Candidate 1.02; May 28, 2014; 20 pages.

"Guide for Conducting Risk Assessments—Information Security"; NIST Special Publication 800-30, Revision 1; NIST, U.S. Dept of Commerce; Sep. 2012; 95 pages.
"Honeywell Industrial Cyber Security Overview and Managed Industrial Cyber Security Services"; HPS; Jun. 4, 2014; 19 pages.
"Information Technology—Security Techniques—Information Security Risk Management"; Bio Standards Publication; BS ISO/IEC 27005;2011; 80 pages.
"Risk Management and Critical Infrastructure Protection: Assessing, Integrating, and Managing Threats, Vulnerabilities and Consequences"; CRS Rpt for Congress; RL32561; Feb. 4, 2005; 28 pages.
"Security for Industrial Automation and Control Systems Part 2-3: Patch Management in the IACS Environment"; ISA-TR62443-2-3-2015; Jul. 1, 2015; 18 pages.
"Design and Planning Guide for System Center 2012—Operations Manager"; System Center 2012; Microsoft Corporation; Apr. 2012; 13 pages.
Hutzler, D., "How to Prevent Attacks on Air Gapped Networks," OPSWAT Blog, https://www.opswat.com/blog/howprevent-attacks-air-gapped-networks, Jan. 16, 2015, 5 pages.
"Symantec™ Control Compliance Suite 11.0 User Guide," Symantec Corporation, https://www.scribd.com/document/126556709/CCS-User-Guide; 2012, 952 pages.
"Configuring Symantec Vulnerability Assessment 1.0 for Network Audits," TECH111985, https://support.symantec.com/en_US/article.TECH111985.html, Jan. 16, 2003, 6 pages.
"iPost: Implementing Continuous Risk Monitoring at the Department of State," Enterprise Network Management, U.S. Department of State, Information Resource Management Office of Information Assurance, Version 1.5, May 14, 2010, 28 pages.
U.S. Appl. No. 14/871,695, Non-Final Office Action dated Dec. 16, 2016, 11 pages.
U.S. Appl. No. 14/871,855, Non-Final Office Action dated Jan. 18, 2017, 12 pages.
U.S. Appl. No. 14/871,732, Non-Final Office Action dated Dec. 30, 2016, 36 pages.
U.S. Appl. No. 14/871,503, Non-Final Office Action dated Dec. 28, 2016, 11 pages.
U.S. Appl. No. 14/871,547, Non-Final Office Action dated Dec. 16, 2016, 12 pages.
U.S. Appl. No. 14/871,605, Non-Final Office Action dated Dec. 19, 2016, 13 pages.
U.S. Appl. No. 14/871,814, Non-Final Office Action dated Dec. 16, 2016, 7 pages.
U.S. Appl. No. 14/871,136, Non-Final Office Action dated Dec. 2, 2016, 18 pages.
U.S. Appl. No. 14/705,379, Non-Final Office Action dated Feb. 7, 2017, 7 pages.
Notification of Transmittal of the International Search Report and the Written Opinion of the International Searching Authority dated Aug. 1, 2016 in connection with International Application No. PCT/US2016/028553, 10 pages.

* cited by examiner

NOTIFICATION SUBSYSTEM FOR GENERATING CONSOLIDATED, FILTERED, AND RELEVANT SECURITY RISK-BASED NOTIFICATIONS

CROSS-REFERENCE TO RELATED APPLICATION

This application claims the benefit of the filing date of U.S. Provisional Patent Application 62/113,221, filed Feb. 6, 2015, which is hereby incorporated by reference.

TECHNICAL FIELD

This disclosure relates generally to network security. More specifically, this disclosure relates to a notification subsystem for generating consolidated, filtered, and relevant security risk-based notifications.

BACKGROUND

Processing facilities are often managed using industrial process control and automation systems. Conventional control and automation systems routinely include a variety of networked devices, such as servers, workstations, switches, routers, firewalls, safety systems, proprietary real-time controllers, and industrial field devices. Often times, this equipment comes from a number of different vendors. In industrial environments, cyber-security is of increasing concern, and unaddressed security vulnerabilities in any of these components could be exploited by attackers to disrupt operations or cause unsafe conditions in an industrial facility.

SUMMARY

This disclosure provides a notification subsystem for generating consolidated, filtered, and relevant security risk-based notifications. A method includes discovering multiple devices in a computing system. The method includes grouping the multiple devices into multiple security zones. The method includes generating a risk value identifying at least one cyber-security risk of the devices for one of the security zones. The method includes comparing the risk value to a threshold. The method includes automatically generating a notification for one or more users when the risk value violates the threshold. Also disclosed are corresponding systems and computer-readable media.

In various embodiments, discovering multiple devices is performed by a data collection component. In various embodiments, grouping the multiple devices into multiple security zones is performed by a rules engine. In various embodiments, grouping the multiple devices into multiple security zones is performed using a risk management database that stores rules and data identifying the cyber-security risks. In various embodiments, generating the risk value is performed for each security zone, and includes generating a respective risk value identifying at least one cyber-security risk of the devices in each respective security zone. In various embodiments, the notification is a System Center Operations Manager notification event. In various embodiments, the notification is transmitted to the one or more users according to a notification recipient list.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
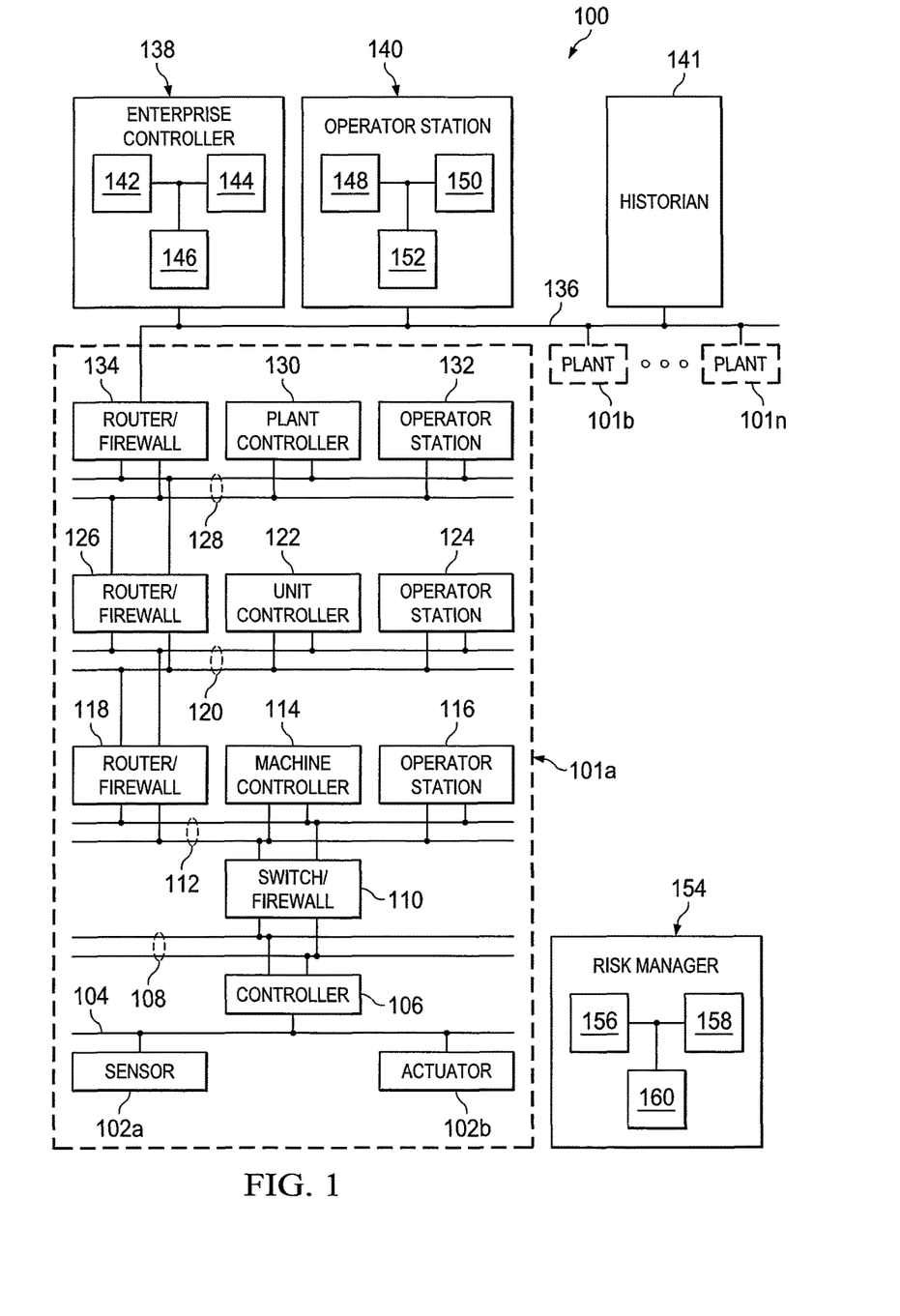
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a proportional-integral-derivative (PID) controller or a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As a particular example, the networks 108 could represent a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers 106, 114, 122, 130, 138 could include one or more processing devices 142 and one or more memories 144 for storing instructions and data used, generated, or collected by the processing device(s) 142. Each of the controllers 106, 114, 122, 130, 138 could also include at least one network interface 146, such as one or more Ethernet interfaces or wireless transceivers. Also, each of the operator stations 116, 124, 132, 140 could include one or more processing devices 148 and one or more memories 150 for storing instructions and data used, generated, or collected by the processing device(s) 148. Each of the operator stations 116, 124, 132, 140 could also include at least one network interface 152, such as one or more Ethernet interfaces or wireless transceivers.

As noted above, cyber-security is of increasing concern with respect to industrial process control and automation systems. Unaddressed security vulnerabilities in any of the components in the system 100 could be exploited by attackers to disrupt operations or cause unsafe conditions in an industrial facility. However, in many instances, operators do not have a complete understanding or inventory of all equipment running at a particular industrial site. As a result, it is often difficult to quickly determine potential sources of risk to a control and automation system.

This disclosure recognizes a need for a solution that understands potential vulnerabilities in various systems, prioritizes the vulnerabilities based on risk to an overall system, and guides a user to mitigate the vulnerabilities. Moreover, this disclosure recognizes that a user needs a reliable and convenient way to be alerted when a risk to a system has occurred. Without automating risk assessment and alerting a user to potential issues, this task can be difficult or almost impossible based on the sheer volume of different systems that can operate within an industrial site.

In accordance with this disclosure, an automated risk assessment and notification technique is supported using a risk manager 154. The risk manager 154 includes any suitable structure that supports a notification subsystem for generating consolidated, filtered, and relevant security risk-based notifications. Here, the risk manager 154 includes one or more processing devices 156; one or more memories 158 for storing instructions and data used, generated, or collected by the processing device(s) 156; and at least one network interface 160. Each processing device 156 could represent a microprocessor, microcontroller, digital signal process, field programmable gate array, application specific integrated circuit, or discrete logic. Each memory 158 could represent a volatile or non-volatile storage and retrieval device, such as a random access memory or Flash memory. Each network interface 160 could represent an Ethernet interface, wireless transceiver, or other device facilitating external communication. The functionality of the risk manager 154 could be implemented using any suitable hardware or a combination of hardware and software/firmware instructions.

Although FIG. 1 illustrates one example of an industrial process control and automation system 100, various changes may be made to FIG. 1. For example, a control and automation system could include any number of sensors, actuators, controllers, servers, operator stations, networks, risk managers, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates an example environment in which the functions of the risk manager 154 can be used. This functionality can be used in any other suitable device or system.

The risk manager 154 is configured to discover various devices in a system, create a database of those devices, and group the devices into "security zones" for further analysis. The devices can be discovered in any suitable manner, such as by using the System Center Operations Manager (SCOM) infrastructure monitoring software tool from MICROSOFT CORPORATION. The devices can also be grouped in any suitable manner, such as grouping devices based on user input or based on physical or operations associations of the devices. The security zones allow the risk manager 154 to determine which devices are connected, indicating where an attack might spread if one device is compromised by assigning a risk value to that issue. The risk value identifies at least one cyber-security risk of the devices in that security zone. Multiple risk values can be monitored, and alerts can be generated based on risk threshold values. Once a threshold risk has been reached, an automatic notification can inform one or more users of a potential issue that might affect a facility's operations.

In some embodiments, this system generally includes a set of preconfigured risk threshold values that act as triggers for notifications when risk values exceed the thresholds. In some embodiments, a rules engine determines when a risk item threshold has been reached by monitoring the preconfigured threshold values, and an event triggers an automatic notification to one or more users when a threshold has been exceeded at the rules engine level. In some embodiments, notifications can be preconfigured to generate emails, text messages, instant messages, short message service (SMS) messages, etc. for a predetermined list of recipients.

Figure 2:
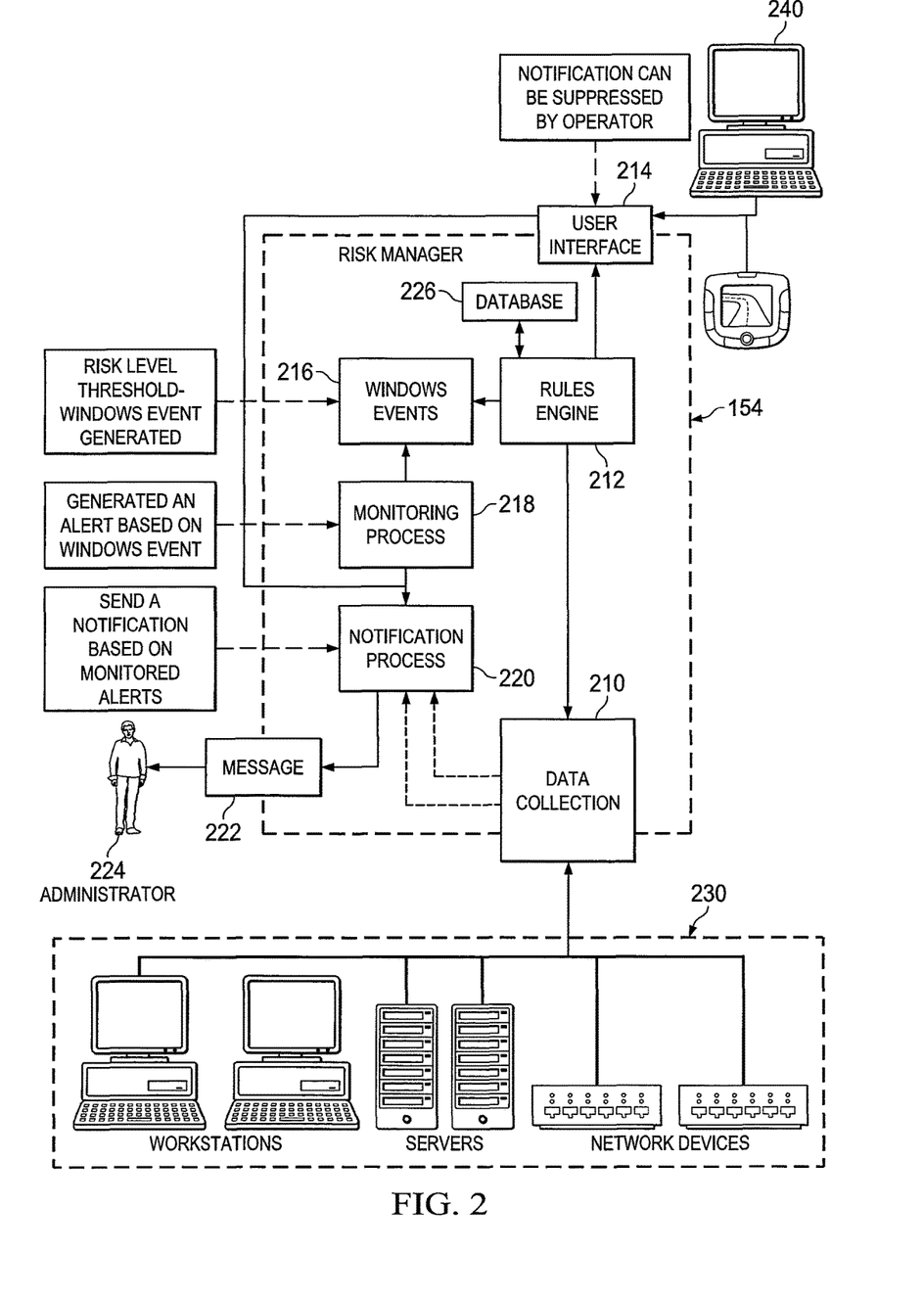
FIG. 2 illustrates an example notification subsystem that generates consolidated, filtered, and relevant security risk-based notifications according to this disclosure.

FIG. 2 illustrates an example notification subsystem that generates consolidated, filtered, and relevant security risk-based notifications according to this disclosure. The notification subsystem could be supported or implemented using the risk manager 154, or any other device configured to operate as described and claimed.

In this example, risk manager 154 includes a data collection component 210 that discovers and collects data from devices 230, which can be any computing devices, including any of the components of FIG. 1. Data collection component 210 can be implemented using a data processing system, controller, or other computing device.

In this example, risk manager 154 also includes a rules engine 212. Rules engine 212 can be implemented using a data processing system, controller, or other computing device. Risk manager 154 can also include a user interface 214 that enables risk manager 154 to display information to and receive input from a user on a client system 240, which can be, for example, a data processing system including a mobile device such as a tablet computer or smartphone.

The following example describes a particular implementation of this notification subsystem using the System Center Operations Manager product from MICROSOFT CORPORATION for notification and data collection. Rules engine 212 can be used for risk value calculation and threshold detection. Note, however, that other implementations of the risk manager 154 could be used.

Risk threshold and suppression timeout values can be configured with a risk manager user interface (UI) 214. As noted above, risk threshold values denote the thresholds that (when violated by their associated risk values) trigger notifications to users or to administrator 224. These values can be stored in a configuration database 226 and used by the rules engine 212 for comparison at runtime against live risk values. As explained below, suppression timeout values can be used to allow notifications to users to be suppressed.

A management pack can monitor WINDOWS event log data or other data for risk value threshold records. This management pack can be risk manager-specific, and data collection can be local to a host system. The rules engine 212 calculates risk items and stores them in the database 226. It also compares risk value thresholds to the calculated risk items. If the rules engine 212 reaches a risk value threshold, it can generate a WINDOWS event or other event that is monitored by a locally-running management pack. This management pack can be configured to generate a notification event, such as a System Center Operations Manager notification event. After the notification event is generated, a message is created and can be sent or transmitted to users identified in a notification recipient list. The notification event can be, for example, a WINDOWS event 216. A monitoring process 218 can the generate an alert based on the WINDOWS event, and pass it to a notification process 220 that sends notifications based on the monitored alerts. The notification can be, for example, a message 222 sent to an administrator 224.

Optionally, if there is a user on-site that can acknowledge the notification, the acknowledgement can suppress the message that would have been sent to the recipient list. If there is no user to acknowledge the notification within the associated suppression timeout value, the notification can be sent as one or more predetermined message types to one or more recipients in the recipient list.

Although FIG. 2 illustrates one example of a notification subsystem that generates consolidated, filtered, and relevant security risk-based notifications, various changes may be made to FIG. 2. For example, the functional division of the components in FIG. 2 are for illustration only. Various components could be combined, further subdivided, rearranged, or omitted and additional components could be added according to particular needs.

Figure 3:
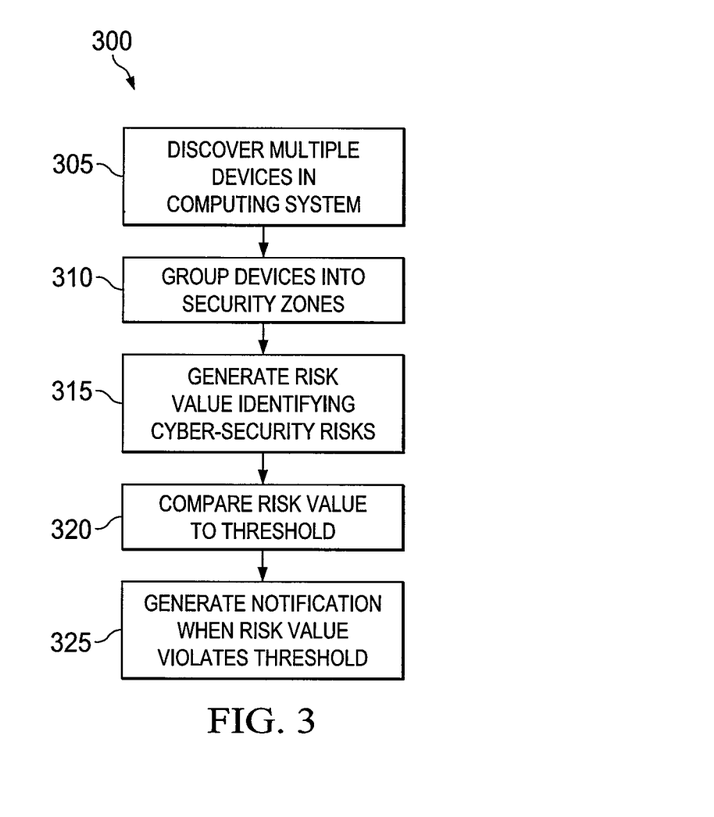
FIG. 3 illustrates a flowchart of a process in accordance with disclosed embodiments.

FIG. 3 illustrates a flowchart of a process 300 in accordance with disclosed embodiments, that can be performed, for example, by risk manager 154, control system 200, or other device configured to perform as described, referred to generically as the "risk manager system" below.

The risk manager system discovers multiple devices in a computing system (305). The discovery process can be performed by a data collection component 210. The devices can be any of the devices 230, including any of the components of industrial process control and automation system 100, and can be any combination of workstations, servers, network devices, or other devices.

The risk manager system groups the multiple devices into multiple security zones (310). This can be performed by a rules engine 212. This can be performed using a risk management database 226 that stores rules and data identifying the cyber-security risks. The risk manager system can also update the risk management database 226 to provide contemporaneous awareness of cyber-security threats to the devices.

The risk manager system generates a risk value identifying at least one cyber-security risk of the devices (315). This process can be performed for each security zone, in which case it is performed to generate the risk value identifying at least one cyber-security risk of the devices in each respective security zone.

The risk manager system compares each risk value to a threshold (320).

The risk manager system automatically generates and displays a notification to one or more users when a risk value violates the threshold (325). The notification can be stored for later analysis. "Violating" can mean exceeding, meeting, or falling below the threshold, depending on the implementation.

Note that the risk manager 154 and/or the notification subsystem shown here could use or operate in conjunction with any combination or all of various features described in the following previously-filed and concurrently-filed patent applications (all of which are hereby incorporated by reference):

- U.S. patent application Ser. No. 14/482,888 entitled "DYNAMIC QUANTIFICATION OF CYBER-SECURITY RISKS IN A CONTROL SYSTEM";
- U.S. Provisional Patent Application No. 62/036,920 entitled "ANALYZING CYBER-SECURITY RISKS IN AN INDUSTRIAL CONTROL ENVIRONMENT";
- U.S. Provisional Patent Application No. 62/113,075 entitled "RULES ENGINE FOR CONVERTING SYSTEM-RELATED CHARACTERISTICS AND EVENTS INTO CYBER-SECURITY RISK ASSESSMENT VALUES" and corresponding non-provisional U.S. patent application Ser. No. 14/871,695 of like title filed concurrently herewith;
- U.S. Provisional Patent Application No. 62/113,100 entitled "TECHNIQUE FOR USING INFRASTRUCTURE MONITORING SOFTWARE TO COLLECT CYBER-SECURITY RISK DATA" and corresponding non-provisional U.S. patent application Ser. No. 14/871,855 of like title filed concurrently herewith;
- U.S. Provisional Patent Application No. 62/113,186 entitled "INFRASTRUCTURE MONITORING TOOL FOR COLLECTING INDUSTRIAL PROCESS CONTROL AND AUTOMATION SYSTEM RISK DATA" and corresponding non-provisional U.S. patent application Ser. No. 14/871,732 of like title filed concurrently herewith;
- U.S. Provisional Patent Application No. 62/113,165 entitled "PATCH MONITORING AND ANALYSIS" and corresponding non-provisional U.S. patent application Ser. No. 14/871,921 of like title filed concurrently herewith;
- U.S. Provisional Patent Application No. 62/113,152 entitled "APPARATUS AND METHOD FOR AUTOMATIC HANDLING OF CYBER-SECURITY RISK EVENTS" and corresponding non-provisional U.S. patent application Ser. No. 14/871,503 of like title filed concurrently herewith;
- U.S. Provisional Patent Application No. 62/114,928 entitled "APPARATUS AND METHOD FOR DYNAMIC CUSTOMIZATION OF CYBER-SECURITY RISK ITEM RULES" and corresponding non-provisional U.S. patent application Ser. No. 14/871,605 of like title filed concurrently herewith;
- U.S. Provisional Patent Application No. 62/114,865 entitled "APPARATUS AND METHOD FOR PROVIDING POSSIBLE CAUSES, RECOMMENDED ACTIONS, AND POTENTIAL IMPACTS RELATED TO IDENTIFIED CYBER-SECURITY RISK ITEMS" and corresponding non-provisional U.S. patent application Ser. No. 14/871,814 of like title filed concurrently herewith;
- U.S. Provisional Patent Application No. 62/114,937 entitled "APPARATUS AND METHOD FOR TYING CYBER-SECURITY RISK ANALYSIS TO COMMON RISK METHODOLOGIES AND RISK LEVELS" and corresponding non-provisional U.S. patent application Ser. No. 14/871,136 of like title filed concurrently herewith; and
- U.S. Provisional Patent Application No. 62/116,245 entitled "RISK MANAGEMENT IN AN AIR-GAPPED ENVIRONMENT" and corresponding non-provisional U.S. patent application Ser. No. 14/871,547 of the like title filed concurrently herewith.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   discovering multiple devices in a computing system by a risk manager system;
   grouping the multiple devices into multiple security zones by a rules engine of the risk manager system using a risk management database that stores rules and data identifying cyber-security risks;

generating a risk value identifying at least one cyber-security risk for the devices of one of the security zones by the risk manager system;
comparing the risk value to a threshold by the risk manager system; and
automatically generating a notification for one or more users by the risk manager system in response to the risk value violating the threshold.

2. The method of claim 1, wherein discovering the multiple devices is performed by a data collection component.

3. The method of claim 1, wherein the risk manager system uses the security zones to determine which of the multiple devices are connected to each other.

4. The method of claim 1, wherein:
the risk value indicates where an attack is able to spread in the one of the security zones if a device in the one of the security zones is compromised.

5. The method of claim 1, wherein generating the risk value is performed for each security zone and includes generating a respective risk value identifying at least one cyber-security risk of the devices in each respective security zone.

6. The method of claim 1, wherein the notification is a System Center Operations Manager notification event.

7. The method of claim 1, wherein the notification is transmitted to the one or more users according to a notification recipient list.

8. A risk manager system comprising:
a controller; and
a display;
wherein the controller is configured to:
discover multiple devices in a computing system;
group the multiple devices into multiple security zones using a rules engine and a risk management database that is configured to store rules and data identifying cyber-security risks;
generate a risk value identifying at least one cyber-security risk for the devices of one of the security zones;
compare the risk value to a threshold; and
automatically generate a notification for one or more users in response to the risk value violating the threshold.

9. The risk manager system of claim 8, wherein the controller is configured to discover the multiple devices using a data collection component.

10. The risk manager system of claim 8, wherein the controller is configured to use the security zones to determine which of the multiple devices are connected to each other.

11. The risk manager system of claim 8, wherein:
the risk value indicates where an attack is able to spread in the one of the security zones if a device in the one of the security zones is compromised.

12. The risk manager system of claim 8, wherein the controller is configured to generate the risk value for each security zone, a respective risk value identifying at least one cyber-security risk of the devices in each respective security zone.

13. The risk manager system of claim 8, wherein the notification is a System Center Operations Manager notification event.

14. The risk manager system of claim 8, wherein the controller is configured to transmit the notification to the one or more users according to a notification recipient list.

15. A non-transitory machine-readable medium encoded with executable instructions that, when executed, cause one or more processors of a risk management system to:
discover multiple devices in a computing system;
group the multiple devices into multiple security zones using a rules engine and a risk management database that is configured to store rules and data identifying cyber-security risks;
generate a risk value identifying at least one cyber-security risk for the devices of one of the security zones;
compare the risk value to a threshold; and
automatically generate a notification for one or more users in response to the risk value violating the threshold.

16. The non-transitory machine-readable medium of claim 15, wherein the instructions that, when executed, cause the one or more processors of the risk management system to discover the multiple devices comprise:
instructions that, when executed, cause the one or more processors of the risk management system to discover the multiple devices using a data collection component.

17. The non-transitory machine-readable medium of claim 15, further encoded with executable instructions that, when executed, cause the one or more processors of the risk management system to use the security zones to determine which of the multiple devices are connected to each other.

18. The non-transitory machine-readable medium of claim 15, wherein the risk value indicates where an attack is able to spread in the one of the security zones if a device in the one of the security zones is compromised.

19. The non-transitory machine-readable medium of claim 15, wherein the instructions that, when executed, cause the one or more processors of the risk management system to generate the risk value comprise:
instructions that, when executed, cause the one or more processors of the risk management system to generate the risk value for each security zone, a respective risk value identifying at least one cyber-security risk of the devices in each respective security zone.

20. The non-transitory machine-readable medium of claim 15, wherein the notification is a System Center Operations Manager notification event.

* * * * *